Aug. 29, 1950     E. A. SWENSON     2,520,346
DOUBLE-WALLED TANK AND DISCHARGE FITTING THEREFOR
Filed May 10, 1947

Inventor
Eric A. Swenson
by Wright, Brown, Quinby & May
Attys

Patented Aug. 29, 1950

2,520,346

UNITED STATES PATENT OFFICE 2,520,346

DOUBLE-WALLED TANK AND DISCHARGE FITTING THEREFOR

Eric A. Swenson, City Mills, Mass.

Application May 10, 1947, Serial No. 747,304

2 Claims. (Cl. 4—68)

This invention relates to a flush tank or equivalent container made of heat-conducting material such as metal or porcelain. In tanks of this kind, the contents are drained with each use and the tank is at once automatically refilled. In warm humid weather, the tap water which flows into the tank is usually considerably cooler than the atmosphere. The cooling of the tank wall often results in condensation of atmospheric moisture on outer surfaces of the tank to such an extent that the condensate drips from the tank. It is an object of the invention to prevent such condensation on the outermost surfaces of a tank by making the tank with a double wall and providing for the drainage of any condensate which may form on the inner wall. According to the invention, I provide an improved and novel fitting through which the contents of the tank can be discharged and which also has passageways for the escape of any condensate which may form on the inner wall of the tank.

For a more complete understanding of the invention, reference may be had to the following description thereof, and to the drawing, of which:

Figure 1:
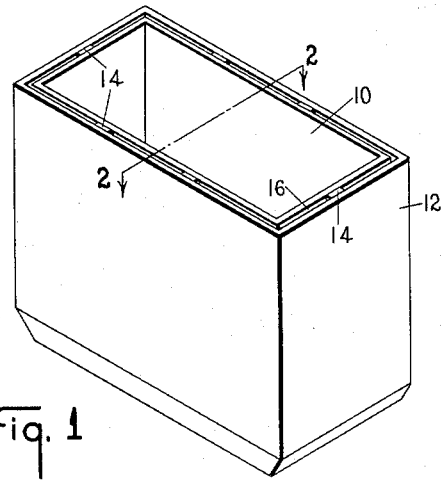
Figure 1 is a perspective view of a tank embodying the invention.

Figure 1 illustrates a flush tank, such as is commonly used in flushing water closets. The tank illustrated comprises a double wall consisting of an inner receptacle 10 surrounded by an outer receptacle 12, these receptacles being maintained by suitable spacing elements 14 in spaced relation with an interspace 16 between the side walls and bottoms of the receptacles. The spacing elements 14 may be blocks or strips of rubber or other equivalent material. Thick washers 15 may also be used with fastening bolts for the same purpose.

Projecting through the bottoms of both of the receptacles is a discharge fitting 20 which is tubular in form with a large central passage 22 for the discharge of water from the interior of the tank. The discharge member 20 is made with a valve seat 24 at its upper end to receive a ball or cone valve 26 which is supported by a stem 28 in the customary manner. Below the upper end of the member 20 is a radial flange 30 which is adapted to bear on the inner surface of the bottom of the inner receptacle 10 a suitable gasket or washer 32 of rubber or the like being employed between the flange 30 and the bottom of the receptacle 10 to prevent leakage around the member 20. The lower end portion of the member 20 is screw threaded as at 34 to receive a nut 36 which bears against the outer surface of the bottom of the outer receptacle 12 so as to secure the fitting in place. A rubber gasket or washer 38 is employed between the nut 36 and the bottom of the outer receptacle 12.

Between the upper end of the fitting 20 and the flange 30 is a lateral projection 40 which has an auxiliary passage 42. This projection 40 is made with attachment means consisting of a short neck 44 which projects upward and is interiorly screw threaded to receive the lower end of an overflow pipe 46. In case the water in the tank rises above the top of the pipe 46, the excess overflows into the pipe and is discharged through the auxiliary passage 42 into the central passage 22 below the valve 26.

Figure 2:
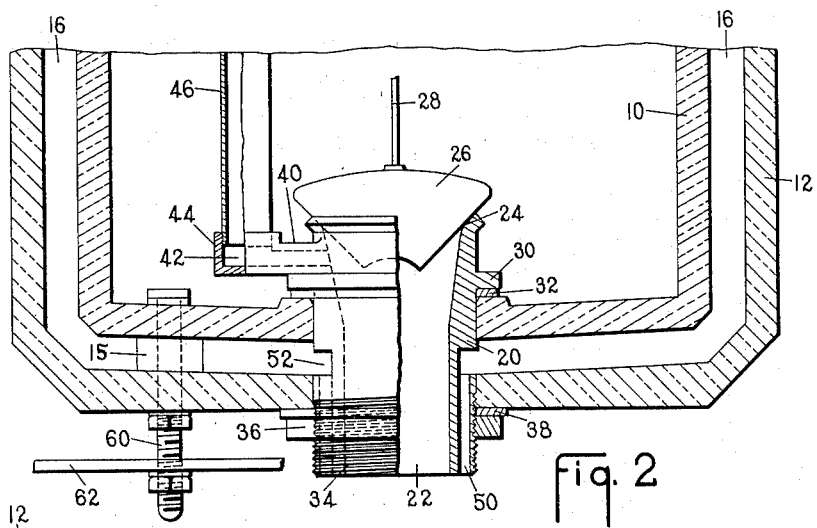
Figure 2 is a fragmentary sectional view on the line 2—2 of Figure 1.
Figure 3:
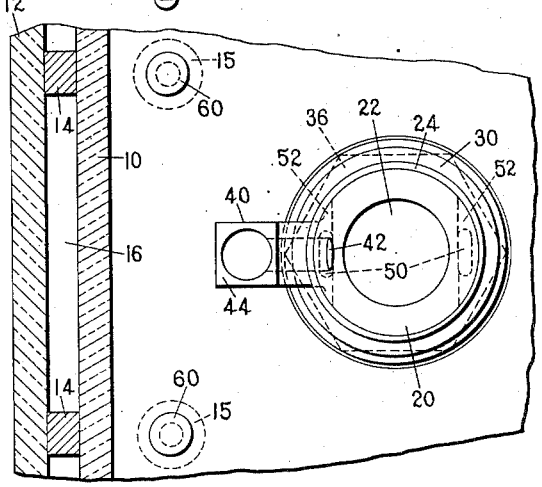
Figure 3 is a fragmentary sectional view of the tank taken in a horizontal plane.

Since atmospheric moisture is apt to condense on the outer surface of the inner receptacle 10 when the latter is cooled below the surrounding air temperature on warm days, condensate gathers and flows down that surface into the lower portion of the interspace 16 between the bottoms of the receptacles. In order to provide for the escape of such condensate, one or more drain conduits 50 are formed in the wall of the lower portion of the member 20. In Figures 2 and 3, two such drain conduits are shown. These conduits extend from lateral orifices in the outer surface of the portion of the member 20 which is between the bottoms of the receptacles down to the lower end of the member 20. As shown in Figure 2, notches 52 are formed in the side walls of the member 20 within the interspace 16, each notch 52 communicating with a small drain conduit 50 so that condensate within the interspace 16 can escape through the notches 52 and the drain conduits 50 down through the lower end of the member 20.

The lower portion of the member 20 is made with walls or wall portions of sufficient thickness to contain the conduits 50 separate from the central passage 22. The upper portion of the member 20 may have thinner walls as indicated in Figure 2, the central passage 22 being shown as flaring upward to some degree from about the midpoint of the member 20.

The tank is supported by any desired means which may include bolts 60 passing through the bottoms of the receptacles and being secured to the top 62 of a water closet seat. Suitable connections (not shown) may be attached to the threaded portion 34 of the discharge fitting 20

I claim:

1. A double-walled tank consisting of two nested receptacles and means holding said receptacles together in spaced relation with an interspace between the bottoms and side walls thereof, in combination with a discharge outlet fitting comprising a tubular member extending through the bottoms of said receptacles, said member having a central passage therethrough and a valve seat at its upper end, a radial flange on said member below said upper end adapted to seat on the inner surface of the inner receptacle, and a nut screw-threaded on the lower portion of said member to engage against the outer surface of the outer receptacle, said member having a drain conduit in the wall of said member opening out through the exterior surface of the member at a point within said interspace and extending down to the lower end of the member.

2. A discharge fitting for a double-wall flush tank with an interspace between the bottom and side walls thereof, said fitting comprising a tubular member having a central passage therethrough and a valve seat in its upper end, a lateral projection near the upper end of said member having an auxiliary passage therein communicating with said central passage, said projection having connecting means to receive an overflow pipe, an exterior radial flange on said member below said projection, and an exterior screw thread on the lower portion of said member, said member having a notch in the outer surface thereof substantially spaced below the level of the bottom face of said flange and adapted for direct communication with said interspace between the bottom of said tank and a conduit in the wall of the member extending from said notch to the lower end thereof.

ERIC A. SWENSON.

REFERENCES CITED

The following references are of record in the file of this patent:

UNITED STATES PATENTS

| Number | Name | Date |
| --- | --- | --- |
| 830,243 | Magowan | Sept. 4, 1906 |
| 940,951 | Bailey | Nov. 23, 1909 |
| 963,738 | Bailey | July 12, 1910 |
| 1,146,558 | Fenton | July 13, 1915 |
| 1,310,497 | Keenan | July 22, 1919 |
| 1,430,571 | Leslie | Oct. 3, 1922 |
| 1,989,859 | Heller | Feb. 5, 1935 |